United States Patent
O'Sullivan et al.

(10) Patent No.: US 9,501,763 B2
(45) Date of Patent: Nov. 22, 2016

(54) SOCIAL COLLABORATIVE SCORING FOR MESSAGE PRIORITIZATION ACCORDING TO A TEMPORAL FACTOR BETWEEN SENDER AND RECIPIENT

(75) Inventors: Patrick J. O'Sullivan, Dublin (IE); Hema Srikanth, Cary, NC (US); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 1301 days.

(21) Appl. No.: 12/015,322

(22) Filed: Jan. 16, 2008

(65) Prior Publication Data

US 2009/0182831 A1  Jul. 16, 2009

(51) Int. Cl.
*G06F 15/16* (2006.01)
*G06Q 10/10* (2012.01)
*H04L 12/58* (2006.01)

(52) U.S. Cl.
CPC ........... *G06Q 10/107* (2013.01); *H04L 12/585* (2013.01); *H04L 51/12* (2013.01)

(58) Field of Classification Search
CPC .. G06Q 10/107; G06Q 10/109; H04L 51/12; H04L 12/585; H04L 51/04; H04L 51/22
USPC ................................................. 709/204–207
See application file for complete search history.

(56) References Cited

U.S. PATENT DOCUMENTS

| | | | |
|---|---|---|---|
| 7,051,284 B2 * | 5/2006 | Uemura et al. ................ | 715/752 |
| 7,185,065 B1 * | 2/2007 | Holtzman ........... | G06F 17/2745 |
| | | | 705/36 R |
| 7,246,323 B2 * | 7/2007 | Uemura et al. ............... | 715/752 |
| 7,454,470 B1 * | 11/2008 | Isaacs et al. ................... | 709/206 |
| 2003/0187937 A1 * | 10/2003 | Yao et al. ..................... | 709/206 |
| 2005/0203929 A1 | 9/2005 | Hazarika et al. | |
| 2007/0203991 A1 * | 8/2007 | Fisher et al. .................. | 709/206 |
| 2007/0290787 A1 | 12/2007 | Fiatal et al. | |
| 2008/0063154 A1 | 3/2008 | Tamari et al. | |
| 2009/0150507 A1 * | 6/2009 | Davis et al. .................. | 709/207 |

\* cited by examiner

*Primary Examiner* — Thai Nguyen
(74) *Attorney, Agent, or Firm* — Steven M. Greenberg, Esq.; CRGO Law

(57) ABSTRACT

Embodiments of the present invention address deficiencies of the art in respect to message prioritization and provide a novel and non-obvious method, system and computer program product for social collaborative prioritization of messages in a messaging system. In an embodiment of the invention, a method for social collaborative prioritization of messages can be provided for a messaging system. The method can include receiving a message from a sender as directed to a recipient, determining a value for a different social collaborative criterion based upon a temporal factor between the sender and the recipient, transforming the value into a priority for the message, and associating the priority with the message in the messaging system.

19 Claims, 1 Drawing Sheet

SOCIAL COLLABORATIVE SCORING FOR MESSAGE PRIORITIZATION ACCORDING TO A TEMPORAL FACTOR BETWEEN SENDER AND RECIPIENT

REFERENCE TO CO-PENDING APPLICATIONS FOR PATENT

The present application is related to the following co-assigned U.S. Patent Applications, which are expressly incorporated by reference herein:

U.S. application Ser. No. 12/015,288, entitled "SOCIAL COLLABORATIVE SCORING FOR MESSAGE PRIORITIZATION ACCORDING TO AN APPLICATION INTERACTION RELATIONSHIP BETWEEN SENDER AND RECIPIENT", filed on Jan. 16, 2008.

U.S. application Ser. No. 12/015,333, entitled "SOCIAL COLLABORATIVE SCORING FOR MESSAGE PRIORITIZATION BASED UPON A SOCIAL NETWORKING RELATIONSHIP BETWEEN SENDER AND RECIPIENT", filed on Jan. 16, 2008.

U.S. application Ser. No. 12/015,340, entitled "SOCIAL COLLABORATIVE SCORING FOR MESSAGE PRIORITIZATION BASED UPON AN ORGANIZATIONAL RELATIONSHIP BETWEEN SENDER AND RECIPIENT", filed on Jan. 16, 2008.

BACKGROUND OF THE INVENTION

Field of the Invention

The present invention relates to the field of computer messaging and more particular to message prioritization in a message folder.

Description of the Related Art

Messaging is the lifeblood of the Internet. The ability for different users geographically dispersed about the globe to exchange messages instantaneously and to universally read those messages irrespective of the type of computer involved has enabled the explosive growth of computing worldwide. Messaging generally includes not only traditional, asynchronous forms of communication including e-mail, discussion forums, blogging, wikis, shared calendaring and tasking, but also synchronous forms of communication including instant messaging, group chats, and the like. Irrespective of the mode of messaging, however, that remote individuals can instantaneously communicate provides the pulse of modern computing.

The ease in which end users can compose and transmit messages to others in an instantaneous fashion is not without consequence, however. Whereas traditional forms of communication—namely the telephone, facsimile and postal service—required some effort on the part of communicants, composing and transmitting a message like an e-mail or instant message requires little effort. Accordingly, the volume of messages traversing the global Internet each minute far exceeds by orders of magnitude those messages transmitted using traditional methods. As a result, entirely new management tools are required to manage the sheer mass of messages end users receive and process each day.

For casual users of messaging, message management can be limited to sorting a view of an inbox for inbound messages. Yet, for advanced users—particularly corporate users—the constraint of the physical size of the view inhibits the ability to see all messages so as to permit manual management of messages through sorting. The problem of message management can be compounded when the number of messages to be managed sums to the hundreds and thousands. In the latter instance, an end user may require days to process each message resulting in a lapse of communication comparable to that of pre-Internet, traditional messaging—the very problem sought to be overcome by Internet based messaging.

To address the problem of message management for a large volume of messages, tools have been developed to prioritize messages either manually or automatically. Once messages have been prioritized, the messages can be sorted in a view to the messages so that the messages of highest priority can appear within eyeshot of an end user. Consequently, the end user can process those messages of greatest importance first, leaving those messages of lesser importance for later processing. Most tools permit the classification of messages by numerical priority, and advanced tools perform prioritization according to the identity of the sender of the message, the time of receipt of the message or keywords in the subject line of the message.

Recently, message management systems have combined different prioritization criteria for automatically sorting and/or filtering messages wherein each of the criteria can be manually weighted by the end user to express a preferred balancing of application of the criteria to inbound messages. Exemplary criteria include whether or not the sender is recognized as an entry in the address book of the recipient, the priority of the message as established by the sender, the extent of participation of the recipient in a thread associated with the message (known as thread participation), and whether the message recipient was designated as the direct recipient, or as the recipient of a carbon copy or blind carbon copy (known as message directness). While the foregoing criteria can be important to many users, in the organizational and social context, the criteria cannot properly prioritize a message according to the relative importance of the message in a social collaborative structure of messengers.

BRIEF SUMMARY OF THE INVENTION

Embodiments of the present invention address deficiencies of the art in respect to message prioritization and provide a novel and non-obvious method, system and computer program product for social collaborative prioritization of messages in a messaging system. In an embodiment of the invention, a method for social collaborative prioritization of messages can be provided for a messaging system. The method can include receiving a message from a sender as directed to a recipient, determining a value for a different social collaborative criterion based upon a temporal factor between the sender and the recipient, transforming the value into a priority for the message, and associating the priority with the message in the messaging system.

In one aspect of the embodiment, the method also can include further determining a value for a different social collaborative criterion and weighting each of the values. In another aspect of the embodiment, the method further can include disabling a determination of one of the social collaborative criterion. In yet another aspect of the embodiment, receiving a message from a sender as directed to a recipient can include receiving a message such as an e-mail, an instant message, a discussion forum posting and a wiki posting, and determining values for different social collaborative criterion based upon a relationship between the sender and the recipient can include determining values for different social collaborative criterion based upon any combination of an organizational relationship, a social networking relationship and an application interaction relationship.

In another embodiment of the invention, a messaging data processing system can be provided. The system can include a messaging server configured for coupling to multiple different messaging clients over a computer communications network. The system also can include social collaboration prioritization logic. The logic can include program code enabled to determine a value for a different social collaborative criterion for a received message based upon a temporal factor between a sender and a recipient of the message, to transform the value into a priority for the message, and to associate the priority with the message.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for social collaborative prioritization of messages in a messaging system. In accordance with an embodiment of the present invention, social collaborative criteria can be weighted and applied to inbound messages in order to either sort or filter the messages in a message view in a messaging system. The social collaborative criteria can include the organizational relationship between a sender of the message and a recipient of the message, an application interaction relationship expressing a number of different applications used by the sender of the message to message the recipient of the message, a temporal relationship indicating whether or not an associated thread of interaction between the sender and the recipient remains active, and a social networking relationship measuring proximal connectivity between the sender and the recipient.

Figure 1:
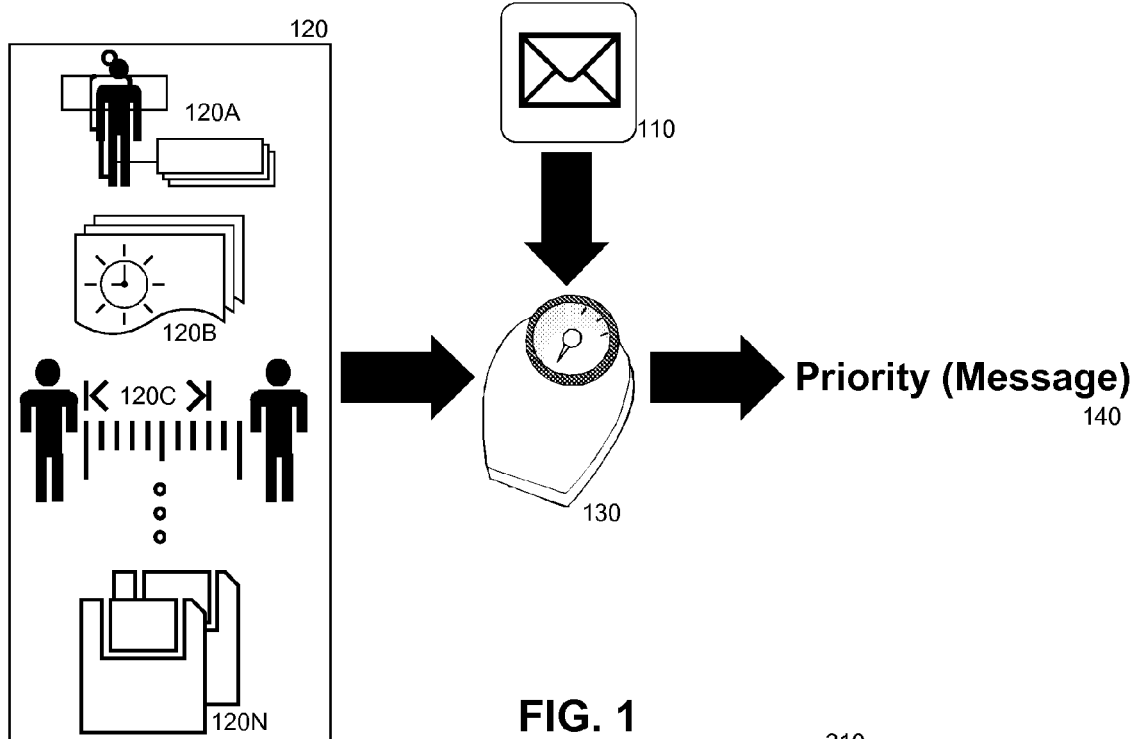
FIG. 1 is a pictorial illustration of a process for social collaborative prioritization of messages.

In further illustration, FIG. 1 is a pictorial illustration of a process for social collaborative prioritization of messages. As shown in FIG. 1, social collaborative criteria 120 for a message 110 can be subjected to weighting 130 to produce a priority 140 for the message 110. The social collaborative criteria 120 can include an organizational relationship 120A. The organization relationship 120A can include a position in an organizational hierarchy for the sender of the message 110 either as an absolute value, or as a relative value compared to a position in the organizational hierarchy of the recipient of the message 110. Optionally, where multiple recipients of the message 110 have been designated, a combination score for the organization relationship 120A can be computed, for instance a summed value, a diminished value by the number of recipients or an average value.

The social collaborative criteria 120 also can include a temporal relationship 120B. The temporal relationship 120B can be defined by the duration in which an associated message thread between the sender of the message 110 and the recipient of the messagee 110 has been active. The longer the message thread has enjoyed continuous activity, the higher the score for the temporal relationship 120B. Once the thread has gone inactive, specifically when no responsive messages have been posted to the thread in a threshold period of time, the score for the temporal relationship 120B will be diminished.

The social collaborative criteria 120 yet further can include a social networking relationship 120C. The social networking relationship 120C can be defined by the close connectivity between the sender of the message 110 and the recipient of the message 110 in a social network. In this regard, the fewer relationships the link the sender of the message 110 and the recipient of the message 110, the higher the score assigned to the social networking relationship 120C indicating a closer relationship between the sender of the message 110 and the recipient of the message 110.

Finally, the social collaborative criteria 120 can include an application interaction relationship 120N. The application interaction relationship 120N can be defined by a number of different messaging applications utilized by the sender of the message 110 in attempting to contact the recipient of the message 110 within a threshold defined period of time. The more applications used by the sender of the message 110 indicate a higher sense of urgency of the message 110 resulting in a higher score for the application interaction relationship 120N.

Notably, the weights 130 can vary from user to user. The weights 130 can be assigned manually and individually for each of the social collaborative criteria 120, or the weights 130 can be assigned as a set. Different sets of the weights 130 can be arranged for different roles in an organization so that the set of weights 130 for a manager may differ from the set of weights 130 for a clerk. Yet further, individual ones of the social collaborative criteria 120 can be enabled or disabled either manually by the end user, or automatically based upon environmental criteria such as time of day. Again, the enablement and disablement of the social collaborative criteria 120 can be included as an automated set and can vary based upon the different roles in an organization for a recipient of the message 110.

Figure 2:
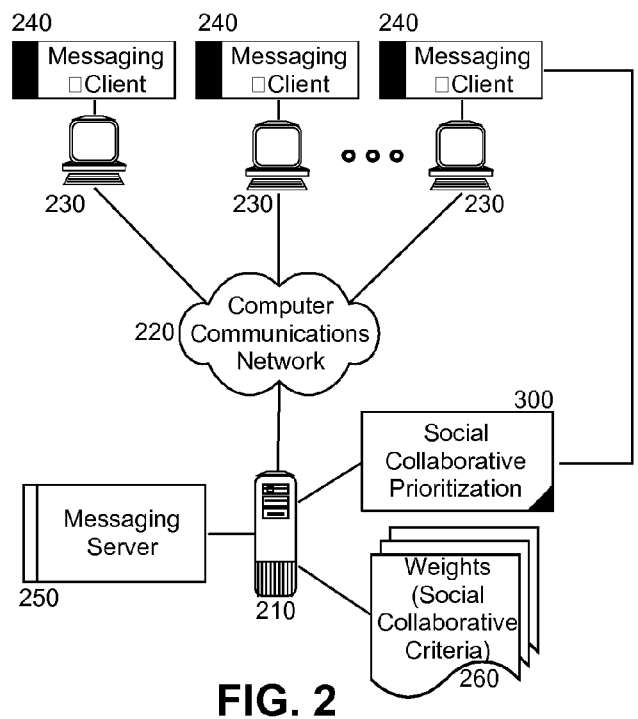
FIG. 2 is a schematic illustration of a messaging system configured for social collaborative prioritization of messages; and, FIG. 3 is a flow chart illustrating a process for social collaborative prioritization of messages in a messaging system.

The process illustrated in FIG. 1 can be performed within a messaging data processing system. In illustration, FIG. 2 schematically depicts a messaging system configured for social collaborative prioritization of messages. The system can include a host server 210 configured for communicative coupling over computer communications network 220 to different computing devices 230, each hosting a corresponding messaging client 240. The host server 210 can support the operation of a messaging server 250, for example an e-mail server, instant messaging server, discussion forum server, wiki server, collaborative server, and the like.

Notably, social collaborative prioritization logic 300 can be coupled to the host server 210, to the messaging clients 240, or both. The social collaborative prioritization logic 300 can include program code enabled to compute a weighted priority for messages flowing from the messaging server 250 to the messaging clients 240 based upon social collaboration criteria, including an organizational relationship of the sender, a temporal relationship between the sender and the recipient, a social networking relationship between the sender and the recipient, and an application interaction relationship between the sender and the recipient of the message. Weights 260 can be applied to each of the collaborative criteria automatically or manually and selectively and the applied ones of the weights 260 can vary based upon the placement of the recipient in an organizational hierarchy or environmental factors. Finally, different ones of the collaborative criteria can be selectively enabled and disabled either manually by the recipient, or automatically based upon the placement of the recipient in the organizational hierarchy or environmental factors.

Figure 3:
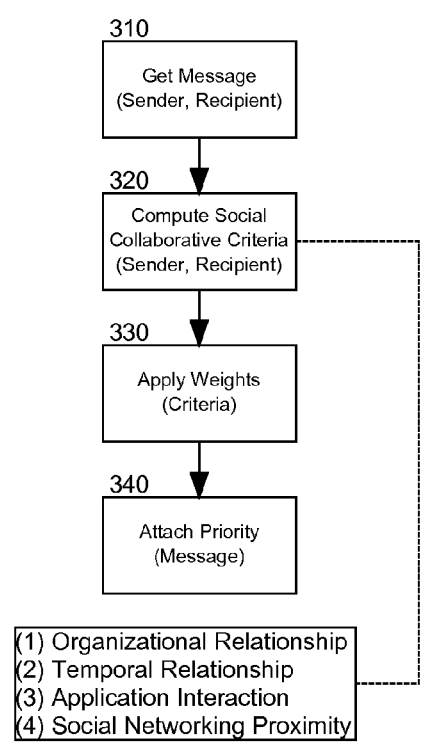

In yet further illustration of the operation of the social collaborative prioritization logic 300, FIG. 3 is a flow chart illustrating a process for social collaborative prioritization of messages in a messaging system. Beginning in block 310, a message can be received from a sender as directed to a recipient. In block 320, a value for each of the social collaborative criteria can be determined for the message. Thereafter, in block 330, each of the values can be weighted and combined to form a priority and in block 340, the priority for the message can be applied to the message. In this way, messages in a view can be sorted or filtered by priority as the priority relates to the social relationship between the sender and the recipient.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for social collaborative prioritization of messages in a messaging system, the method comprising:
   receiving a message from a sender as directed to a recipient;
   determining a value for a social collaborative criterion based upon a temporal factor between the sender and the recipient indicating a duration in which an associated message thread of messages between the sender and recipient has been active, the value being higher the longer the message thread has enjoyed continuous activity, the value being diminished responsive to when the message thread has gone inactive and when no responsive messages have been posted to the thread within a threshold period of time;
   transforming the value into a priority for the message; and,
   associating the priority with the message in the messaging system.

2. The method of claim 1, further comprising:
   further determining a value for a different social collaborative criterion; and,
   weighting each of the values into a single value for transformation into the priority.

3. The method of claim 2, further comprising
   disabling a determination of one of the social collaborative criterion.

4. The method of claim 3, wherein
   the disabled social collaborative criterion is a pre-determined set of the social collaborative criterion, the set being associated with an organizational position of the recipient of the message.

5. The method of claim 2, wherein
   the value for the different social collaborative criterion is determined based upon at least two relationships selected from the group consisting of an organizational relationship, a social networking relationship and an application interaction relationship.

6. The method of claim 2, wherein
   the value for the different social collaborative criterion is determined based upon a weighted combination of an organizational relationship, a social networking relationship and an application interaction relationship.

7. The method of claim 2, wherein
   the value for the different social collaborative criterion is determined based upon a weighted combination of at least two relationships each selected from the group consisting of an organizational relationship, a social networking relationship and an application interaction relationship.

8. The method of claim 2, wherein
   the weighting comprises applying a set of weights to each of the values, the set being associated an organizational position of the recipient of the message.

9. The method of claim 1, wherein
   the received message is selected from the group consisting of an e-mail, an instant message, a discussion forum posting and a wiki posting.

10. A messaging data processing system comprising:
a messaging server configured to couple to a plurality of messaging clients over a computer communications network; and
social collaboration prioritization logic comprising program code configured to
determine a value for a social collaborative criterion for a received message based upon a duration in which an associated message thread of messages between the sender and recipient has been active, the value being higher the longer the message thread has enjoyed continuous activity, the value being diminished responsive to when the message thread has gone inactive and when no responsive messages have been posted to the thread within a threshold period of time,
transform the value into a priority for the message, and associate the priority with the message.

11. A computer program product comprising a non-transitory computer usable storage medium having stored therein computer usable program code for social collaborative prioritization of messages in a messaging system, the computer usable program code, which when executed by a computer hardware system causes the computer hardware system to perform:
receiving a message from a sender as directed to a recipient;
determining a value for a social collaborative criterion based upon a temporal factor between the sender and the recipient indicating a duration in which an associated message thread of messages between the sender and recipient has been active, the value being higher the longer the message thread has enjoyed continuous activity, the value being diminished responsive to when the message thread has gone inactive and when no responsive messages have been posted to the thread within a threshold period of time;
transforming the value into a priority for the message; and
associating the priority with the message in the messaging system.

12. The computer program product of claim 11, wherein the computer hardware system is further caused to perform further determining a value for a different social collaborative criterion; and
weighting each of the values into a single value for transformation into the priority.

13. The computer program product of claim 12, wherein the computer hardware system is further caused to perform disabling a determination of one of the social collaborative criterion.

14. The computer program product of claim 13, wherein the disabled social collaborative criterion is a pre-determined set of the social collaborative criterion, the set being associated with an organizational position of the recipient of the message.

15. The computer program product of claim 12, wherein the value for the different social collaborative criterion is determined based upon at least two relationships selected from the group consisting of an organizational relationship, a social networking relationship and an application interaction relationship.

16. The computer program product of claim 12, wherein the value for the different social collaborative criterion is determined based upon a weighted combination of an organizational relationship, a social networking relationship and an application interaction relationship.

17. The computer program product of claim 12, wherein the value for the different social collaborative criterion is determined based upon a weighted combination of at least two relationships each selected from the group consisting of an organizational relationship, a social networking relationship and an application interaction relationship.

18. The computer program product of claim 12, wherein the weighting comprises applying a set of weights to each of the values, the set being associated an organizational position of the recipient of the message.

19. The computer program product of claim 11, wherein the received message is selected from the group consisting of an e-mail, an instant message, a discussion forum posting and a wiki posting.

* * * * *